Figure 1:
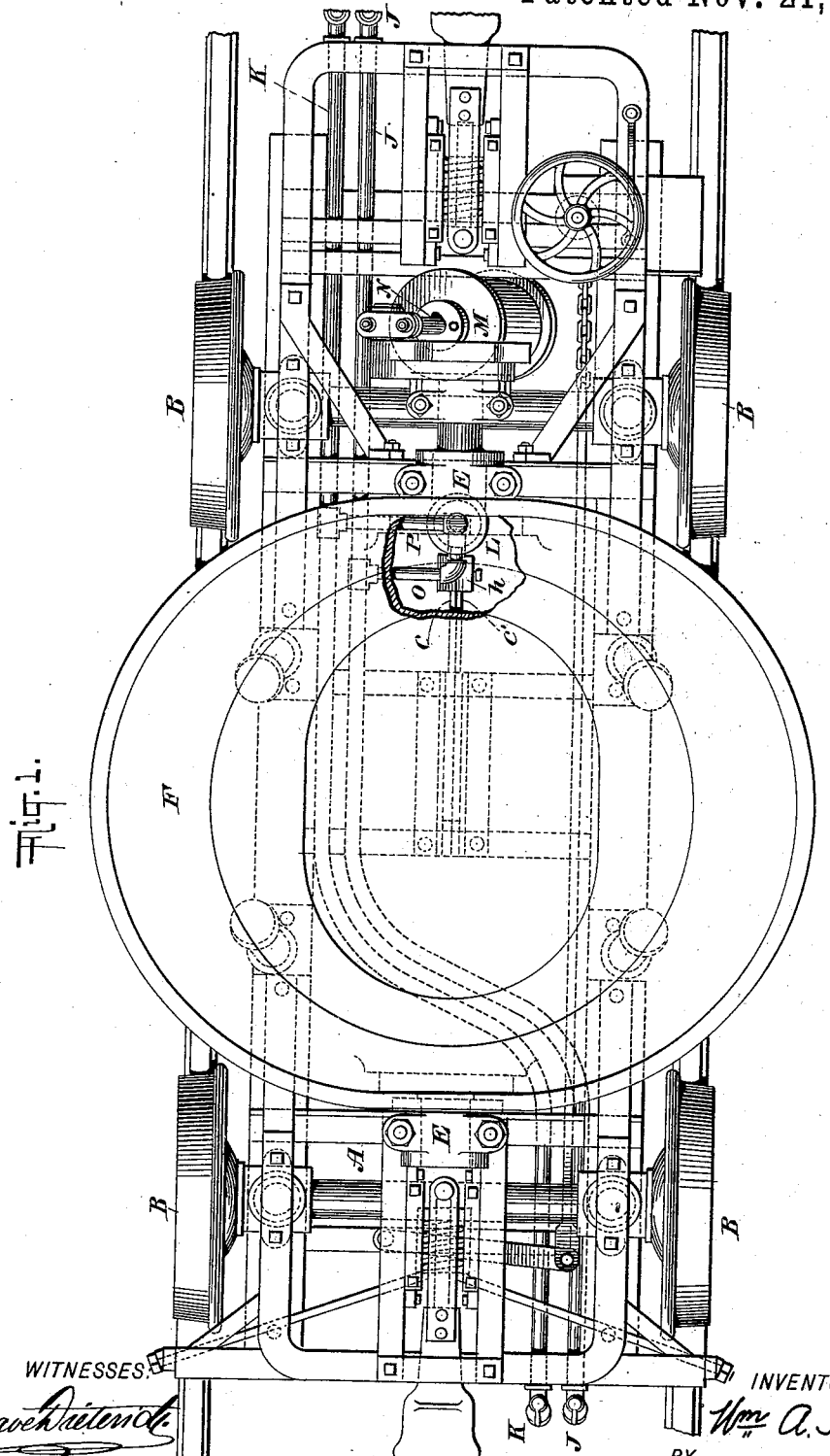

(No Model.)

6 Sheets—Sheet 1.

W. A. THACHER.
DUMPING CAR.

No. 508,998. Patented Nov. 21, 1893.

WITNESSES.
Gustave Dieterich
Ed. D. Miller.

INVENTOR
Wm. A. Thacher,
BY
Chas. O. Gill
ATTORNEY.

THE NATIONAL LITHOGRAPHING COMPANY,
WASHINGTON, D. C.

(No Model.) 6 Sheets—Sheet 3.

W. A. THACHER.
DUMPING CAR.

No. 508,998. Patented Nov. 21, 1893.

WITNESSES:
Gustave Dieterich
Ed. D. Miller

INVENTOR
William A. Thacher,
BY
Chas. C. Gill,
ATTORNEY.

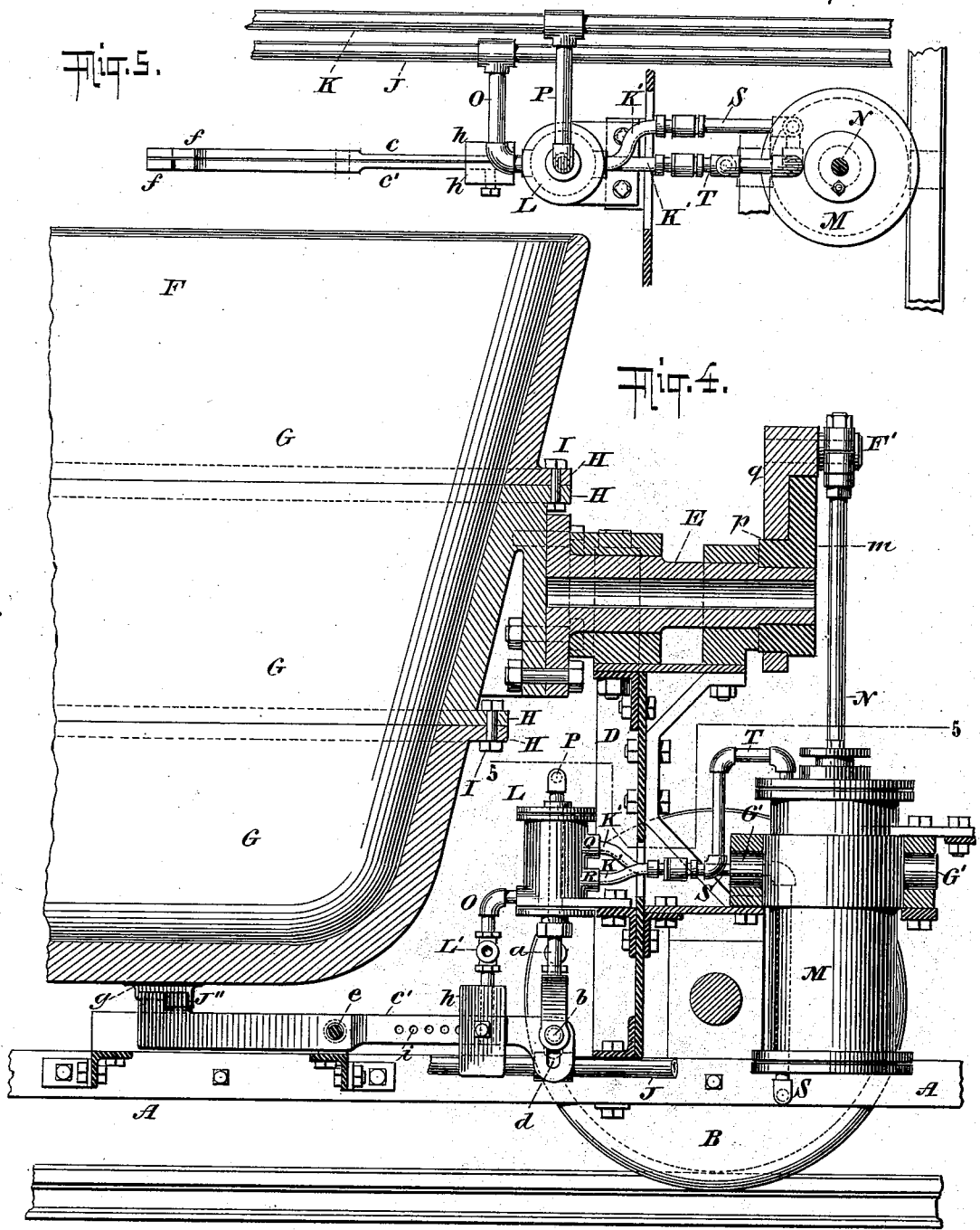

(No Model.) 6 Sheets—Sheet 5.
W. A. THACHER.
DUMPING CAR.
No. 508,998. Patented Nov. 21, 1893.
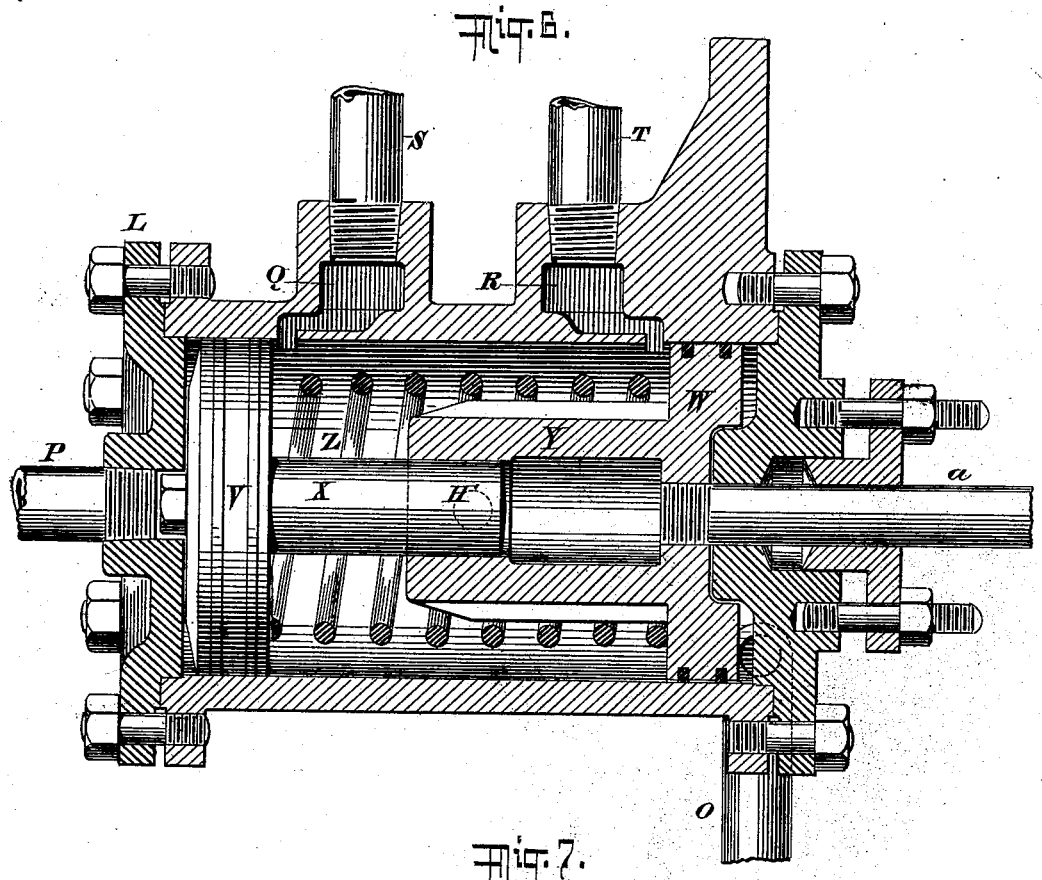
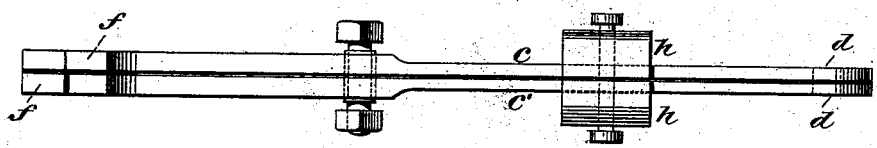
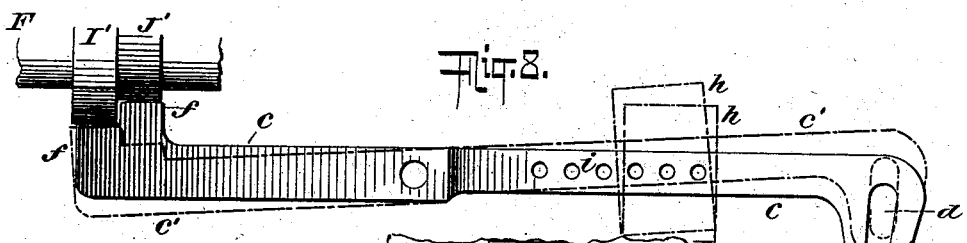
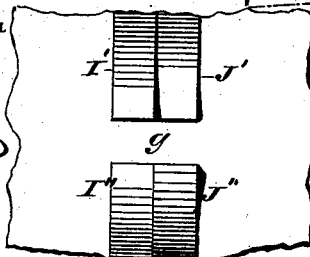
WITNESSES:
Gustave Dieterich
Ed. W. Miller
INVENTOR
Wm. A. Thacher,
BY
Chas. O. Gill
ATTORNEY.

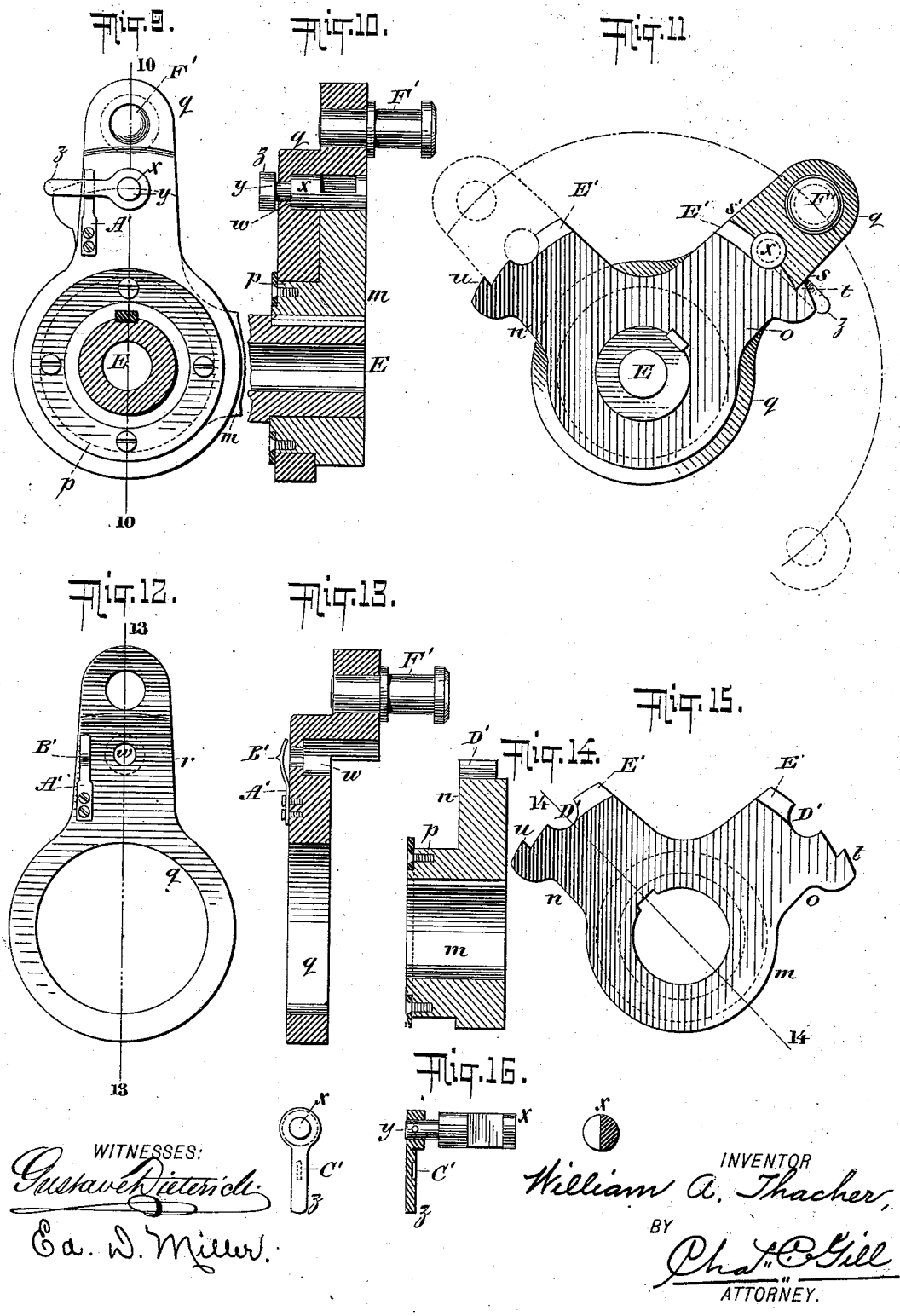

UNITED STATES PATENT OFFICE.

WILLIAM A. THACHER, OF NEW YORK, N. Y.

DUMPING-CAR.

SPECIFICATION forming part of Letters Patent No. 508,998, dated November 21, 1893.

Application filed July 18, 1893. Serial No. 480,820. (No model.)

*To all whom it may concern:*

Be it known that I, WILLIAM A. THACHER, a citizen of the United States, and a resident of New York, in the county of New York and State of New York, have invented certain new and useful Improvements in Dumping-Cars, of which the following is a specification.

The invention belongs to the class of dumping cars in which the car body or receptacle is pivotally mounted and capable of being tilted by compressed air mechanism to dump or discharge its contents. Each car of the train is furnished with the tilting body or receptacle, latch mechanism for locking the body or receptacle in its upright position, and a dumping cylinder whose piston rod operates to tilt the car body and then return it to position, the cylinders throughout the train being connected with main pipe lines leading from the reservoir for compressed air located on the locomotive. The operation of the car bodies is under the direct control of the engineer, who by means of a valve may direct the compressed air into either main pipe line, thus to free the latch mechanism and tilt or dump the car bodies, or return said bodies to their upright position.

Examples of the class of cars to which the present invention pertains may be found in Letters Patent of the United States heretofore granted to William A. Thacher and numbered and dated as follows: No. 489,242 of January 3, 1893; No. 489,243 of January 3, 1893, and No. 496,672 of May 2, 1893.

The car made the subject of the present application is intended more particularly for the transportation of cinders or slag, and hence the car body or receptacle is given the form appropriate for this use. The main features of novelty reside more especially in the sectional construction of the receptacle or slag pot, the latch cylinder and connecting mechanism for securing the receptacle in its upright position, the means provided for tilting the receptacle or car body to either side of the track without detaching the piston rod of the dumping cylinder, and the general combination of parts, all as hereinafter fully described.

In accordance with my invention the car body or receptacle in the form of a slag-pot is mounted on trunnions extending from its sides and is composed of separable sections independently capable when broken or worn or otherwise rendered unfit for use of being renewed by new sections without discarding the sections which are suitable for further use; and in the employment of the said receptacle one of its trunnion shafts is provided with an axially movable crank arm to which the piston rod of the dumping cylinder is secured and which according to its position determines whether the movement of said rod shall tilt the receptacle to the right or left.

The invention is not confined in every instance to the special form of car body or receptacle above referred to nor to the use of said body or receptacle for carrying cinders or slag, since a portion of the invention is equally applicable to tilting car bodies of whatever form may be desired or appropriate to the transportation of the material to be carried.

The invention will be more readily understood from the detailed description hereinafter presented, reference being had to the drawings forming a part of this application.

Figure 2:
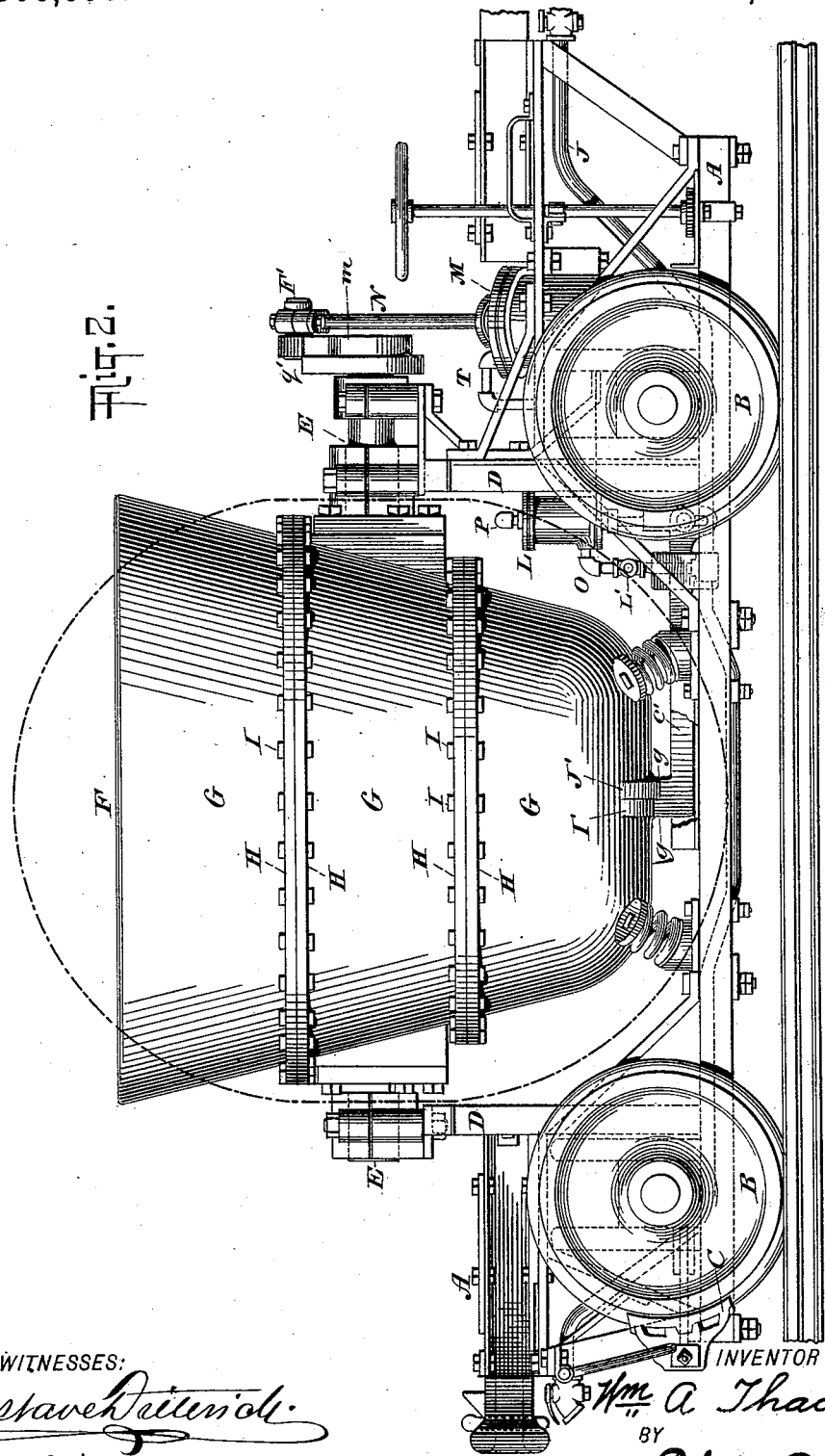
Figure 3:
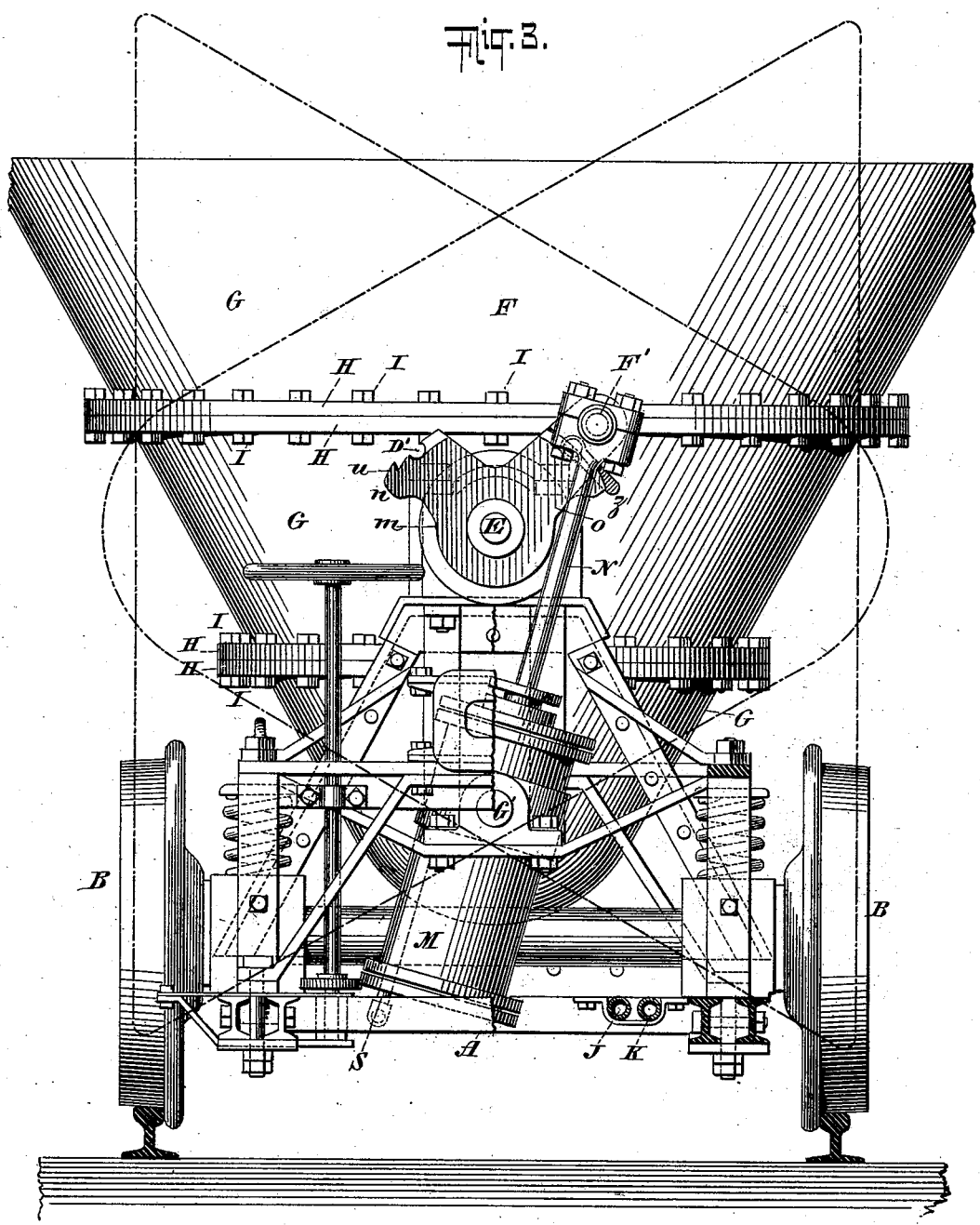

Referring to the accompanying drawings, Figure 1 is a top view, partly broken away, of a dumping car constructed in accordance with and embodying the invention. Fig. 2 is a side elevation of same, the dotted line representing the outline of the upper edge of the car body or slag-pot when tilted to discharge its contents. Fig. 3 is an end view of same, the dotted lines illustrating the positions of the car body or slag-pot when tilted to discharge its contents. Fig. 4 is an enlarged section through the longitudinal center of the car body or slag-pot and one of the trunnions thereof, the section being a central, vertical longitudinal section of a portion of the car for the purpose of illustrating on an enlarged scale the compressed air mechanism utilized for tilting the car body or slag-pot. Fig. 5 is a section of same on the dotted line 5—5 of Fig. 4. Fig. 6 is an enlarged central vertical section of the latch cylinder. Fig. 7 is an enlarged top view of the latch levers. Fig. 8 is a side elevation of same (the front one being shown by dotted lines) with a detached portion of the bottom of the slag pot. Fig. 8ª is an enlarged detached view of a portion of the bottom of the car body or receptacle. Fig. 9 is a vertical transverse section of one trunnion shaft of the car body and illustrating on an enlarged scale an elevation of the movable or adjustable crank arm and connections by which the piston rod of the dumping cylinder is enabled to tilt the car body to either side of the track. Fig. 10 is a vertical section of same on the dotted line 10—10 of Fig. 9. Fig. 11 is an elevation of same illustrating the side of the crank arm and connections opposite to that shown in Fig. 9. Fig. 12 is a detached elevation of the crank arm for connection with the piston rod of the dumping cylinder. Fig. 13 is a vertical section of same on the dotted line 13—13 of Fig. 12. Fig. 14 is a detached vertical section on the dotted line 14—14 of Fig. 15 of a plate keyed on the trunnion shaft of the tilting car body and receiving the adjustable crank arm illustrated in Figs. 12 and 13. Fig. 15 is an elevation of same. Fig. 16 represents the end, face and section of the locking pin by which the said keyed plate and adjustable crank arm may be locked together.

In the drawings A designates the frame of the car truck, which will be provided with the usual wheels B, brakes C and means for coupling the cars to form the train. The frame A supports at about its longitudinal center and in proper relation to each other the standards D, D, in the upper ends of which are journaled the trunnions E, E, of the tilting car body or receptacle or slag-pot F.

When the tilting car body F is to be utilized for carrying slag or cinders, it will be of the general form illustrated in the accompanying drawings and will be composed of the independent separable sections G, having flanges H and secured together by means of the bolts I passing through said flanges. The tilting receptacle or slag-pot F is usually subjected to severe usage and rapidly becomes unfit for use or eaten through especially at its bottom and upper edges by foreign matter contained in the slag, which as is well known is placed in the receptacle while in a fluid condition. The purpose of making the slag-pot F in sections G bolted together is to enable one of the sections if worn or useless to be removed and replaced by a new section without discarding the entire receptacle and particularly without discarding the more expensive middle sections carrying the trunnion shafts. It will be apparent upon reference to Figs. 2 and 4 that if the upper or the lower section G for instance, becomes worn or broken it can be very quickly and at comparatively very small expense removed and another section substituted therefor without discarding the middle section or to any material extent disturbing the mechanism of the car.

It is the purpose of the invention to tilt or dump the car body or slag-pot F of whatever form or construction it may assume to either side of the track by means of compressed air mechanism, and to this end the frame A supports the main pipe lines J, K, for compressed air leading from the reservoir on the locomotive and supplying air under pressure to the latch cylinder L and dumping cylinder M in the manner hereinafter described.

The dumping cylinder M contains the customary piston and is provided with the usual piston rod N. The latch cylinder L is connected at its lower end by a pipe O with the main pipe line J and at its upper end by a pipe P with the main pipe line K. The latch cylinder L is further provided with two outlet ports Q, R, communicating with pipes S, T, leading respectively to the lower and upper ends of the dumping cylinder M. The interior portions of the latch cylinder L are shown on an enlarged scale in Fig. 6, in which it will be observed that the latch cylinder is provided with the pistons V, W, the former having a short rod X entering and adapted to be guided in its longitudinal movement by the sleeve Y formed on the inner face of the piston W. Between the pistons V, W, and encircling the sleeve Y is provided the coiled spring Z which becomes compressed when the piston V approaches the piston W or the piston W approaches the piston V and operates to cushion the moving piston and to aid in returning it to position, after the pressure of the compressed air has been relieved therefrom. The piston W is provided with the piston rod $a$ which extends downward, as illustrated in Fig. 4, and is connected by a pivot $b$ with the end of the weighted latch levers $c, c'$, the said levers being provided with elongated slots $d$ to receive the pivot $b$. The levers $c\ c'$ are pivotally secured at $e$ and have upon their outer end the engaging lips or flanges $f$ which at the proper time enter the recess $g$ formed on the receptacle F and lock the latter in its upright position. The inner ends of the latch levers $c, c'$ are provided with the weights $h$ which by reason of the series of apertures $i$ may be adjusted in position along said levers at will. The recess $g$ is formed between the facing ends of the inclines I', J', and I'', J'', formed on each side of the center of the bottom of the receptacle F, as shown more clearly in Figs. 8 and 8ª in which it will be seen that the inclines I' and J'' are higher than the inclines J', I''. The engaging flanges $f$ on the ends of the latch levers $c, c'$ are cut or recessed to follow said inclines, as indicated in Fig. 8.

When the car body is returning to vertical position after having been tilted to the right, the inner end or higher edge of the flange $f$ of the lever $c$ will ride on the incline J', and the outer end or higher edge of the flange $f$ of the lever $c'$ will ride on the incline I', and as soon as the car body reaches its vertical position the flanges $f$ will enter the recess $g$ and lock said body in position. The flanges $f$ of the levers $c, c'$ will be prevented from passing over or failing to enter the recess $g$ by reason of the fact that the incline J' is not so high as the incline J'', and hence when the car body reaches its vertical position the flange $f$ on the lever $c$ will pass from the incline J' to a point against the vertical face of the incline J'' and thereby arrest any further movement of the car body and enter the recess $g$, the flange on the lever $c'$ at this time following the flange on the lever $c$ into said recess.

When the car body is returning to position after having been tilted to the left the outer end or higher edge of the flange $f$ of the lever $c'$ will ride on the incline I'' and the inner end or higher edge of the flange $f$ of the lever $c$ will ride on the incline J'', and as soon as the car body reaches its vertical position the flanges $f$ will enter the recess $g$ and lock said body in position, the flange $f$ of the lever $c'$ arresting any further movement of the car body by passing from the incline I'' against the vertical face of the incline I'.

The purpose of the inclines I', J', I'', J'' is to afford a certain means for causing the flange $f$ of the lever $c$ to enter the recess $g$ when the car body is returned to position after having been dumped to the right, and the flange $f$ of the lever $c'$ to enter said recess when the car body is returned to position after having been tilted to the left. The elongated slots $d$ in the end of the levers $c, c'$, permit a definite loose play of the levers on the pivot pin $b$ of the rod $a$ sufficient for the levers to adapt themselves to the surfaces of the inclines I', J', I'', J'', the weights $h$ serving to keep the engaging ends of said levers against said inclines and to cause the flanges $f$ to enter the recess $g$ when the car body reaches its vertical position.

Upon the outer end of the trunnion shaft E (see Figs. 3, 4, and 9 to 16 inclusive) is keyed the plate $m$ having the arms $n, o$, and collar $p$ upon which collar is mounted the crank arm $q$ adapted at the proper time to have a revolving motion on the collar $p$ of the plate $m$, while the plate $m$ can have no such movement on the trunnion E since it is rigidly keyed thereon. The upper portion of the crank arm $q$ is provided with the shoulders $s, s'$, adapted to engage the shoulders $t, u$ of the plate $m$, as indicated by full and dotted lines in Fig. 11, and the said upper portion of the said crank arm contains the aperture $w$ adapted to receive the locking pin $x$, whose reduced end $y$ projects through the said arm and carries the handle $z$ by which the said pin $x$ may be turned to lock or unlock the crank arm to or from the plate $m$, as hereinafter explained. Upon the rear face of the crank arm $q$ is secured an engaging spring A' having a shoulder B' in position to enter a recess C' formed in the handle $z$ and retain the handle in position without at the same time making it inconvenient to free the handle in order to turn the pin $x$ when it is desired to either lock or unlock the same from the plate $m$. The upper edges of the arms $n, o$ of the plate $m$ correspond with each other and each is provided with the semi-circular recess D' and angular recess E', the latter being to permit the pin $x$ to pass to and from the recesses D'.

In the operation of the car constructed in accordance with the invention, when the crank-arm $q$ is secured by means of the locking pin $x$ to the arm $o$ the movement of the piston rod N will operate to tilt the car body F to one side of the track, and when the said arm is by means of said pin $x$ secured to the arm $n$ of said plate $m$ the usual movement of the piston rod N will operate to tilt the car body F to the opposite side of the track, and hence it will be observed that the position of the crank arm $q$ will determine the question as to whether the car body shall tilt to one side or the other. If it is desired to dump the contents of the car body to, for instance, the left hand side of the track, the crank arm $q$ will be secured to the arm $n$ of the plate $m$, as shown by dotted lines in Fig. 11, and if it should be desired that the contents of the car be dumped to the other or right hand side of the track the crank arm $q$ will be secured to the arm $o$ of the plate $m$ as shown by full lines in Figs. 3 and 11. Thus with simply the shifting of the crank-arm $q$ and without altering any other feature of the construction the car body F may be tilted to either side of the track at will.

In Figs. 9, 10 and 11 the crank-arm $q$ is illustrated as secured to the arm $o$ of the plate $m$, and in these figures it will be observed that the position of the handle $z$ is such that it is retained in position by the spring A' and the middle semi-circular side of the pin $x$ is within the semi-circular recess D' of said arm $o$ and the shoulder $s$ of the crank-arm is against the shoulder $t$ of the plate $m$.

When the crank arm $q$ is in the position shown in Figs. 9, 10 and 11 it will appear evident that the semi-circular portion of the pin $x$, being in the recess D', will prevent the said crank arm from moving in either direction except with the plate $m$ and trunnion E, which latter has a rigid connection with the side of the tilting car body F.

When the crank arm $q$ is secured to the arm $o$ as illustrated in Fig. 11, the downward movement of the piston rod N will pull downward on the pin F' secured to the crank arm (the shoulder $t$ aiding in supporting the strain by reason of its contact with the shoulder $s$) and this downward movement of the piston rod N pulling on the pin F' will have the effect of causing the arm $q$, plate $m$ and trunnions E to turn toward the right as indicated by dotted lines in said Fig. 11 and effect the tilting of the car body or receptacle F to the position indicated by dotted lines in Fig. 3, which indicates that the contents of the receptacle F will be tilted to the right hand side of the track.

When it is desired that the contents of the receptacle or car body F shall be tilted to the left hand side of the track the crank-arm $q$ will be freed from the arm $o$ of the plate $m$ and secured to the arm $n$ of said plate, and this may be accomplished by simply turning the handle $z$ a sufficient distance to remove the semi-circular portion of the locking pin $x$ from the recess $D'$ and causing it thereby to turn upward, in which position it will be free of the arm $o$ and at such time the arm $q$ may be turned to the left on the collar $p$ until the shoulder $s'$ meets the shoulder $u$ of the arm $n$ as indicated by dotted lines in Fig. 11, whereupon by reversing the movement of the locking pin $x$ its semi-circular portion will be turned downward into the recess $D'$ of said arm $n$ and thereby lock the arm $q$ and the arm $n$ together. When the arm $q$ and arm $n$ are thus locked together by the pin $x$, the movement of the piston rod $N$ will have the effect of tilting the car body to the opposite side of the track from which it was tilted before. Thus when the arm $q$ is secured to the arm $o$ of the plate $m$ the car body under the usual movement of the piston rod $N$ will be tilted to the right hand side of the track, and when the arm $q$ is secured to the arm $n$ of the plate $m$ the effect of the downward movement of the piston rod $N$ will be to tilt the car body toward the left hand side of the track. The dumping cylinder $M$ is mounted on trunnions $G'$ and hence the one cylinder with its rod $N$ will accommodate itself to the position of the crank-arm $q$.

In the operation of the invention or the method of using the car constructed in accordance therewith, the compressed air contained in the reservoir of the locomotive will be turned into either the pipe $J$ or the pipe $K$ passing through the train, according to whether it is desired to tilt the car body $F$ to discharge its contents or to return the tilted car body to its normal or vertical position. It may be assumed that the car body $F$ is in its vertical position and has reached the point at which its contents are to be discharged, and at this time the engineer will turn the valve which controls the compressed air so as to direct the latter into the pipe $J$, through which it will pass entirely through the train and find its way upward through the branch pipes $O$ into all the latch cylinders $L$ of the train. The effect of the air passing upward through the pipe $O$ and into the lower end of the latch cylinder $L$ is to elevate the piston $W$ in its said cylinder and thereby afford a communication for the air from the pipe $O$ into the port $R$ and pipe $T$, passing to the upper end of the dumping cylinder $M$. The air entering the upper end of the dumping cylinder $M$ depresses the piston therein and thereby through the piston rod $N$ pulls downward on the crank-arm $q$, causing the turning of the trunnion shaft $E$ and the car body $F$, the latter being thus tilted or turned over upon its side as indicated by dotted lines in Fig. 3 and caused to discharge its contents. The air entering the latch cylinder $L$ through the pipe $O$ effects, as above described, the elevation of the piston $W$ for the purpose of uncovering the port $R$ and permitting the compressed air to pass through the pipe $T$ into the upper end of the dumping cylinder $M$, and in addition to this function the piston $W$ effects the further purpose of drawing upward on its piston rod $a$ and elevating the inner ends of the latch levers $c, c'$, the result of which is that just previous to the compressed air entering the pipe $T$ and dumping cylinder $M$ the latch levers will be withdrawn from the recess $g$, thus freeing the tilting car body $F$ and permitting the piston rod $N$ to cause the revolving movement of the same on its trunnions. The freeing of the latch levers $c, c'$, from the recess $g$ is almost simultaneous with the admission of the air to the dumping cylinder, and hence there is no danger of the car body acting or moving except under the influence of the compressed air under the control of the engineer. After the car body $F$ has been turned upon its side and its contents discharged, the engineer on the locomotive will turn the valve controlling the compressed air so as to cut off the supply from the pipe $J$ and cause it to enter the pipe $K$, the effect of which will be that the compressed air will ascend through the pipe $P$ to the upper end of the latch cylinder $L$ and depress the piston $V$ so as to establish a communication between the pipe $P$, port $Q$, pipe $S$ and lower end of the dumping cylinder $M$. At the same time the air having been cut off from the pipe $J$, the piston $W$ under the influence of the spring $Z$ and weights $h$ will descend to its lower position below the port $R$, thus permitting whatever air may have remained in the pipe $T$ and upper end of the cylinder $M$ to exhaust through the aperture $H'$. The lowering of the piston $W$ also causes the locking flanges $f$ on the latch levers $c, c'$ to ascend in contact with and follow the inclines $I', J', I'', J''$, on the lower end of the receptacle $F$ so as to be in position when the latter reaches its vertical position to quickly enter the recess $g$ on said receptacle and lock the same in position. The air entering the lower end of the dumping cylinder $M$ from the pipes $P, S$, as above mentioned, causes the piston in the dumping cylinder to ascend and push, through the rod $N$ and crank-arm $q$ the receptacle $F$ to its vertical position, upon arriving at which said receptacle will, as above mentioned, be locked by the latch levers $c, c'$, entering the recess $g$.

From the foregoing description it will be observed that the air entering the lower end of the latch cylinder $L$ elevates the piston $W$ to free the latch levers $c\ c'$ and to open the port $R$, through which the air will pass to the pipe $T$ and thence to the upper end of the dumping cylinder $M$ for the purpose of tilting the car body or receptacle $F$ to discharge its contents; that when the air is cut off from the pipes $J$ and $O$ leading to the lower end of the latch cylinder and permitted to enter the pipes $K$ and $P$ passing to the upper end of the latch cylinder the piston $W$ will descend to establish communication between the pipe T and exhaust H' and to permit the engaging ends of the latch levers c c' to elevate to position to lock the receptacle F as soon as the latter shall have reached its vertical position; and that the piston V under the action of the air entering the pipe P will descend to direct the compressed air through the port Q and pipe S to the lower end of the dumping cylinder M for the purpose of returning the car body to its vertical position. The cylinder L thus not only operates as a latch cylinder to regulate the movement of the latch levers c but also serves to direct the compressed air to the proper end of the dumping cylinder and to permit the air at one end of said cylinder to exhaust while the air is being directed into the other end of said cylinder. The arrangement of pistons V, W, and spring Z, in the latch cylinder L is a feature of importance since by having the two piston heads separated from each other, with the spring between them, the air entering the pipe O has simply to elevate the piston W instead of the combined weight of the pistons V, W, and the spring Z after the air has been cut off from the pipe P has simply to elevate one head V instead of the combined weight of the heads V, W.

During the tilting of the car body F and during the shifting of the crank arm q from one arm to the other of the plate m, the upper end of the piston rod N turns on the crank pin F', and the dumping cylinder M turns on its trunnions G' to accommodate itself to the longitudinal plane of the piston rod N, and in order to permit this movement of the dumping cylinder M without straining the pipe connections, sections of yielding or flexible tubing K' are provided in the pipes S, and T, as shown in Fig. 4.

In the pipe O of each car of the train will be provided a cut off valve L' (Fig. 4) of any suitable well known form, which when turned to close the pipe O of any special car will cut off that car from the influence of the compressed air, and hence the car thus cut out of the air lines will remain unaffected while the remaining cars of the train may be dumped at will.

What I claim as my invention, and desire to secure by Letters Patent, is—

1. In a dumping car, a pivotally mounted car body or receptacle, and the oscillating dumping cylinder connected at its ends with pipes for supplying compressed air thereto, combined with an adjustable connection intermediate the piston rod of said cylinder and said receptacle whereby the rod may tilt the receptacle to either side as desired; substantially as set forth.

2. In a dumping car a pivotally mounted car body or receptacle, latch mechanism for locking the body or receptacle in an upright position, and the oscillating dumping cylinder connected at its ends with pipes for supplying compressed air thereto, combined with an adjustable connection intermediate the piston rod of said cylinder and said receptacle whereby the rod may tilt the receptacle to either side as desired; substantially as set forth.

3. In a dumping car, a car body or receptacle having and mounted upon trunnions extending from its sides, combined with a dumping cylinder connected at its ends with pipes for supplying compressed air thereto, and a crank arm intermediate the piston rod of said cylinder and one of said trunnions; substantially as set forth.

4. In a dumping car, a car body or receptacle having and mounted on trunnions extending from its sides, combined with an oscillating dumping cylinder connected at its ends with pipes for supplying compressed air thereto, and an adjustable crank arm intermediate the piston rod of said cylinder and one of said trunnions; substantially as set forth.

5. In a dumping car, a car body or receptacle having and mounted on trunnions extending from its sides, combined with latch mechanism for locking said body or receptacle in its upright position, a latch cylinder and rod for operating said mechanism, an oscillating dumping cylinder connected at its ends with pipes for supplying compressed air thereto, and an adjustable crank arm intermediate the rod of said dumping cylinder and one of said trunnions; substantially as set forth.

6. In a dumping car a car body or receptacle mounted on trunnions, the rigid plate secured on one of said trunnions, the adjustable crank arm adjacent to said plate and means for locking said arm in its adjusted positions to said plate, combined with the oscillating dumping cylinder connected at its ends with pipes for supplying compressed air thereto and having its piston rod pivotally secured to said crank arm; substantially as set forth.

7. In a dumping car, a car body or receptacle mounted on trunnions, the rigid plate secured on one of said trunnions and having shoulders and recesses at each side of its vertical center, the adjustable crank arm adjacent to said plate, and adapted to engage said shoulders, and the revoluble locking pin carried by said arm and adapted to engage said recesses, combined with the oscillating dumping cylinder connected at its ends with pipes for supplying compressed air thereto and having its piston rod pivotally secured to said crank arm; substantially as set forth.

8. In a dumping car, a tilting car body or receptacle, and a dumping cylinder connected to tilt said body or receptacle, combined with the latch cylinder having its rod connected with latch mechanism for locking said receptacle in its upright position, pipes leading from the air supply to the ends of said latch cylinder, pipes leading from said latch cylinder to opposite ends of said dumping cylinder, the independent heads movable in said latch cylinder, the spring between said heads, and an exhaust from said latch cylinder between said heads; substantially as set forth.

9. In a dumping car, a tilting car body or receptacle, and a dumping cylinder connected to tilt said body or receptacle, combined with the pivotally mounted and weighted latch lever adapted to engage and lock said body or receptacle in its upright position, the latch cylinder connected at its ends with pipes supplying compressed air thereto and containing the independently movable heads separated by a spring, the piston rod extending from one of said heads to an elongated slot in the shank end of said latch lever, pipes leading from said latch cylinder to the ends of said dumping cylinder, and an exhaust from said latch cylinder between said movable heads; substantially as set forth.

10. In a dumping car, a tilting car body or receptacle and a dumping cylinder connected to tilt said body or receptacle, combined with the inclines of varying height on said receptacle, the pivotally mounted weighted latch levers having engaging flanges adapted to ride on said inclines and enter a locking recess, the latch cylinder connected at its ends with pipes supplying compressed air thereto and having its piston rod connected with said latch levers and pipes leading from said latch cylinder to the dumping cylinder; substantially as set forth.

11. In a dumping car, a tilting car body or receptacle, and a dumping cylinder connected to tilt said body or receptacle, combined with the latch cylinder having its rod connected with latch mechanism for locking said receptacle, pipes leading from the air supply to the ends of the latch cylinder, pipes leading from said latch cylinder to opposite ends of the dumping cylinder, the independent heads movable in said latch cylinder and one having a guide sleeve receiving a rod from the other, the spring between said heads, and an exhaust from said latch cylinder between said heads; substantially as set forth.

Signed at New York, in the county of New York and State of New York, this 11th day of July, A. D. 1893.

WILLIAM A. THACHER.

Witnesses:
  CHAS. C. GILL,
  ED. D. MILLER.